United States Patent [19]

Berejka

[11] 4,332,655
[45] Jun. 1, 1982

[54] ADHESIVE COMPOSITIONS COMPRISING ETHYLENE/POLAR MONOMER COPOLYMER AND AN ELASTOMER

[75] Inventor: Anthony J. Berejka, San Ramon, Calif.

[73] Assignee: Raychem Corporation, Menlo Park, Calif.

[21] Appl. No.: 152,433

[22] Filed: May 22, 1980

Related U.S. Application Data

[63] Continuation of Ser. No. 568,207, Apr. 15, 1975, abandoned.

[51] Int. Cl.$^3$ .................... C08L 23/16; C08L 23/08
[52] U.S. Cl. .................... 204/159.2; 525/141; 525/143; 525/145; 525/192; 525/211; 525/221; 525/222; 525/227
[58] Field of Search ............... 525/211, 221, 222, 227; 204/159.2

[56] References Cited

U.S. PATENT DOCUMENTS

| | | | |
|---|---|---|---|
| 3,226,454 | 12/1965 | Marans et al. | 260/876 R |
| 3,328,194 | 6/1967 | Kasper | 204/159.14 |
| 3,410,928 | 11/1968 | Baum | 260/897 B |
| 3,433,573 | 3/1969 | Holladay et al. | 204/159.2 |
| 3,454,676 | 7/1969 | Busse | 260/897 B |
| 3,616,363 | 10/1971 | Millian | 204/159.14 |
| 3,663,662 | 5/1972 | Golike et al. | 260/897 A |
| 3,770,572 | 11/1973 | Henry et al. | 260/897 B |
| 3,833,689 | 9/1974 | Usamoto et al. | 260/897 B |
| 3,847,721 | 11/1974 | Evans | 204/159.2 X |
| 3,886,234 | 5/1975 | Ishihara et al. | 260/878 R |
| 3,904,470 | 9/1975 | Fukuki et al. | 260/897 B |
| 3,941,859 | 3/1976 | Batuik et al. | 260/897 B |
| 3,950,281 | 4/1976 | Usamoto et al. | 260/897 B |

*Primary Examiner*—Carman J. Seccuro
*Attorney, Agent, or Firm*—Lyon & Lyon

[57] ABSTRACT

Compositions comprising a mixture of an adhesive copolymer of ethylene and a monoolefinically unsaturated polar comonomer, for example, vinyl acetate, in combination with an olefin rubber, preferably a rubbery copolymer of ethylene and propylene, exhibit excellent adhesive properties, particularly when applied to nonporous surfaces such as metals. Creep resistance can be improved by lightly crosslinking the composition with radiation. Typically thermoplastic in nature, these compositions can be made thermosetting by including in the composition a heat activated crosslinking system. The compositions also exhibit resistance to blocking and flexibility at low temperatures.

27 Claims, No Drawings

ADHESIVE COMPOSITIONS COMPRISING ETHYLENE/POLAR MONOMER COPOLYMER AND AN ELASTOMER

This is a continuation of application Ser. No. 568,207, filed Apr. 15, 1975, now abandoned.

FIELD OF THE INVENTION

This invention relates to adhesive compositions. More particularly, this invention relates to adhesive compositions comprising a mixture of an adhesive polymer and an elastomeric polymer.

BACKGROUND OF THE INVENTION

Copolymers of ethylene and a monolefinically unsaturated polar comonomer such as vinyl acetate, methyl methacrylate, acrylic acid, and the like have been widely employed for their adhesive properties particularly for the reason that they form firm bonds to nonporous substrates such as metals or glass.

Even though the aforementioned copolymers exhibit superior qualities as adhesives their application is limited by two significant shortcomings. In damp or humid environments or in applications where the adhesive can otherwise be contacted by water, the adhesive bond fails. Furthermore, in those environments where arctic or sub-artic conditions are encountered, for example, below about −40° F., the adhesives become inflexible and fracture under dynamic conditions.

As a consequence of these shortcomings, it is an object of this invention to provide adhesive compositions capable of retaining their adhesive properties and flexibility in humid environments and at low temperature.

SUMMARY OF THE INVENTION

The present invention provides adhesive compositions comprising a blend of normally adhesive copolymer of ethylene and a monolefinically unsaturated polar comonomer in combination with an elastomeric olefin polymer having a saturated backbone, e.g. a diene modified elastomeric olefin polymer. Preferred adhesive polymers are copolymers of ethylene and a vinyl-unsaturated ester such as vinyl acetate and, optionally, an olefinically unsaturated organic acid such as acrylic acid as a co- or third monomer. Preferred elastomeric polymers are copolymers of ethylene and propylene.

The adhesives of this invention may be lightly crosslinked by radiation to improve creep resistance and can form the basis of thermosetting compositions by inclusion of suitable chemical crosslinking agents which can be activated by heat.

DETAILED DESCRIPTION OF THE INVENTION

The adhesive compositions of the present invention exhibit excellent adhesive properties, have a low blocking tendency, retain their flexibility at low temperatures and their adhesive bonds are stable in damp or humid conditions.

The normally adhesive olefin of the present invention comprises an adhesive copolymer of ethylene and a monolefinically unsaturated polar comonomer. Suitable comonomers include monolefinically unsaturated organic esters and acids copolymerizable with ethylene. Among suitable unsaturated esters are the vinyl esters of alkanoic and aromatic acids including, but not limited to, vinyl acetate, vinyl propionte, vinyl butyrate, vinyl isobutyrate, vinyl benzoate and the like. Alkyl and aryl acids of monolefinically unsaturated esters are also useful. They include, but are not limited to methyl acrylate, ethyl acrylate, methyl methacrylate, ethyl methacrylate, n-butyl acrylate, phenyl acrylate, methyl crotonate, ethyl crotonate and the like. Suitable unsaturated acids include acrylic and methacrylic acid. Applicable copolymers include those of ethylene with one or more of the aforementioned monomers. Particularly preferred copolymers are those of ethylene and vinyl acetates and terpolymers of ethylene with vinyl acetate and either acrylic or methacrylic acid.

Suitable adhesive polymers comprise at least about 50% by weight combined ethylene. Preferably they contain between 50 to about 85% by weight of combined ethylene. Such polymers preferably have a melt index, as determined at 190° C. and 2160 gms, of about 2 to 1000, preferably not higher than about 500 nor less than about 4. The normally adhesive polymers of low melt index, i.e. below about 50, are best employed in those applications where it is desirable that the adhesive bear a portion of the load to which the structure that it forms a part is exposed. By contrast, normally adhesive polymers of relatively high melt index, i.e. above about 50 are most useful where significant flow of the adhesive is desired, for example to fill voids or flow about articles of irregular cross-section.

Elastomeric polymers suitable for use in adhesive compositions of the present invention are those derived from olefin monomers, for example butyl rubbers. Presently preferred for use are elastomeric polymers derived from monoolefinically unsaturated monomers in which the polymer has a saturated backbone. Particularly preferred are the elastomeric copolymers of ethylene and propylene although other elastomers may be employed. Useful ethylene-propylene copolymers are those having from about 40–90% by weight combined ethylene, the balance propylene or propylene and a diene modifier, the latter to give the polymer a reactive group pendent to the polymer backbone. Propylene will comprise at least about 10% by weight of the polymer and the diene comprises 0–10% by weight of the polymer. If used, the diene will preferably comprise 2–10% by weight of the polymer.

The diene modifiers are selected from non-conjugated dienes of which the following are a representative rather than exhaustive list: 1,4-hexadiene, 1,6-hexadiene, 1,4-pentadiene, bicyclopentadiene, and ethylidene norbornene.

Presently preferred polymers are those having a relatively low molecular weight and a relatively low ethylene content, the latter to cause the elastomer to have lower crystallinity, so as to minimize interfacial stress during adhesive bond formation.

The useful copolymer rubbers typically have a Mooney viscosity (ML 4 at 250° F.) that vary over the range from about 20–75 with those providing the best results in adhesive blends having a viscosity varying over the range of about 25–70.

The adhesive compositions may contain up to about 50 parts by weight of the elastomeric polymer in a composition comprising 100 parts by weight of elastomer and normally adhesive polymer and usually comprises 15 to about 50 parts, e.g. 20–50 parts, by weight. Blends exhibiting the best properties comprise from about 20–35 parts by weight of elastomeric polymer.

The adhesive blends may contain additional quantities of other ingredients normally incorporated into such compositions including tackifiers, fillers such as carbon black, antioxidants and other stabilizers. The amounts of these can vary according to the properties desired and optimum amounts are easily determined by those skilled in the art.

The polymeric constituents and other additives to the adhesive compositions can be mixed in conventional compounding equipment. It is usually desirable to initially compound the elastomer and addends prior to incorporating the normally adhesive copolymer, particularly in the case of those having a high melt index.

The many advantages of the present invention will be apparent from a consideration of the following examples.

EXAMPLE I

A series of adhesive blends were prepared employing Elvax 4320 as the normally adhesive copolymer. Available from the DuPont Co., Wilmington, Del., it is a terpolymer of ethylene, vinyl acetate (~25%) and acrylic acid (acid number ~6) having a melt index, reported, of 150. The elastomer component of the blends was Nordel 2522, available from the DuPont Co., a copolymer of ethylene, propylene and 1,4-hexadiene having a Mooney viscosity of 25(ML +4 at 250° F.).

Data obtained from blends having 0–50 parts by weight of Nordel 2522 are recorded in Table I on the next page. The data of Table I, clearly demonstrates the unexpected superiority of the adhesive compositions of the present invention over that of a similar prior art composition. From a consideration of Table I, it can be seen that the normally adhesive copolymer alone or with but 5% elastomer incorporated formed an adequate adhesive bond between polyethylene and steel. However, when aged in water, the adhesive composition of these blends lifted within 96 hours at 23° C.

water. Furthermore, the mode of failure for the adhesive blends of the invention was cohesive rather than adhesive unlike the composition of the prior art.

The blends containing the copolymer elastomer also exhibited better low temperature flexibility than the prior art adhesive as indicated by the brittle point determinations and blocking resistance was equivalent to that of the prior art composition.

EXAMPLE II

The effect of varying the elastomer component of the adhesive blend of this invention was demonstrated in a series of blends comprising 65 parts by weight of Elvax 4320 and 35 parts by weight of the following ethylene-propylene copolymer rubbers.

|  | Relative Crystallinity | Relative Mol. Wt. | Mooney Viscosity (ML 4 at 250° F.) |
|---|---|---|---|
| Nordel 1560 | High | High | 60 |
| Nordel 1070 | Low | High | 70 |
| Nordel 1145 | Intermediate | Intermediate | 45 |
| Nordel 2722 | High | Low | 25 |
| Nordel 2522 | Low | Low | 25 |
| Vistalon 404 | Low | Low | 40 (at 212° F.) |

The Nordel elastomers are ethylene propylene copolymers modified with 1,4-hexadiene. Vistalon 404, available from the Exxon Co., is an ethylene-propylene copolymer elastomer. High crystallinity is an indication of relatively high ethylene content (up to about 80% by weight) whereas low crystallinity or more amorphous character is an indication of a relatively low ethylene content (~40–55% by weight) in the copolymer. Data obtained from these blends are recorded in Table II on the next page.

The data of Table II demonstrates that the effect of

TABLE I

EFFECT OF EP ELASTOMER BLEND RATIO IN ADHESIVE BLENDS

| Blend ratio | | | | | |
|---|---|---|---|---|---|
| Elvax 4320: | 100 | 95 | 80 | 65 | 50 |
| Nordel 2522: — | 5 | 20 | 35 | 50 | |
| Melt Index: (at 190° C.) | 182 | 160 | 64 | 20 | 17 |
| Low temperature brittle point: (ASTM D-746) | −40° C. | −60° C. | <−70° C. | −65° C. | <−70° C. |
| Blocking resistance: (1 psi, 1 hour at 70° C.) | first degree | first degree | first degree | first degree | slight second degree |
| 180° Bent loop resistance to peel (polyethylene sheet to steel pulled at 2 in/min) | | | | | |
| Initial: | 15 piw | 16 piw | 30 piw | 17 piw | 6 piw |
| Mode of failure: | adhesive to p.e. | adhesive to p.e. | cohesive | cohesive | cohesive |
| Aged: (96 Hours in water at 23° C.) | lifted (from steel) | lifted (from steel) | 30 piw cohesive some adhesive to steel | 13 piw cohesive | 8 piw cohesive |

By contrast, blends containing 20–50% of the elastomer initially formed bonds with similar resistance to peel (in the case of the 80/20 blend significantly better resistance to peel was observed) and the bonds did not fail nor significantly degrade during a 96 hour immersion in employing elastomers of relatively high crystallinity and/or relatively high molecular weight is to impair the ability of the adhesive to withstand exposure to dampness. Nevertheless, the blends exhibited good low temperature flexibility as indicated by their low temperature brittle points varying over the range of −55° C. to below −70° C. Samples with elastomers of low crystallinity and molecular weight generally exhibited cohesive failure in the resistance to peel tests as well as excellent bond retention in a moist environment.

EXAMPLE III

A series of blends were prepared to demonstrate the utility of normally adhesive copolymers of low melt index in the adhesive compositions of the present invention. The composition of these blends is shown in Table III below.

TABLE II

| Low Melt Index Adhesive Olefin/EPDM Blends | | | | |
|---|---|---|---|---|
| Compounds | Parts by Weight | | | |
| Elvax 4824 | 65 | — | 65 | 65 |
| Dexon XEA-4 | — | 65 | — | — |
| Nordel 1320 | 35 | 35 | 35 | 35 |
| Bakelite CKM 1634 | 5 | 10 | — | — |
| Schnectady FRJ551 | — | — | 5 | — |
| Schnectady SP-553 | — | — | — | 5 |

TABLE III

| EFFECT OF EP ELASTOMER TYPE IN ADHESIVE BLENDS | | | | | | |
|---|---|---|---|---|---|---|
| EP elastomer: | N-1560 | N-1070 | N-1145 | N-2722 | N-2522 | V-404 |
| Relative, Crystallinity: | High | Low | Intermediate | High | Low | Low |
| Relative Molecular Weight: | High | High | Intermediate | Low | Low | Low |
| Melt Index: (at 90° C.) | 30 | 11 | 21 | 30 | 20 | 11 |
| Low temperature brittle point: (ASTM D-746) | −65° C. | −55° C. | <−70° C. | <−70° C. | −65° C. | −65° C. |
| Blocking resistance: (1 psi, 1 hr at 70° C.) | first degree | first degree | first degree | first degree | first degree | first degree |
| 180° Bent loop resistant to peel (polyethylene sheet to steel) pulled at 2 in/min) | | | | | | |
| Initial: | 14 piw | 45 piw | 30 piw | 22 piw | 17 piw | 28 piw |
| Mode of failure: | adhesive to p.e. | cohesive | adhesive to p.e. | adhesive to p.e. | cohesive | cohesive |
| Aged: (96 hours in water at 23° C.) | lifted | lifted | 22 piw mixed adhesive to p.e. and adhesive to steel | lifted | 13 piw cohesive | 30 piw cohesive adhesive steel |

Elvax 4824 is a terpolymer of ethylene, vinyl acetate (20%) and methacrylic acid (acid number 7–11) having a melt index of ~6. Dexon XEA-4, a product of Exxon Co., is a terpolymer of ethylene, vinyl acetate (6%) and acrylic acid (1.5%) having a melt index of ~4. Nordel 1320 is an ethylene-propylene elastomer modified with 1,4-hexadiene having a Mooney Viscosity of 18 (ML 1+4 at 250° F.). Bakelite CKM 1634 and Schnectady FRJ 551 are heat-reactive phenolic resins with 10–12% methylol content which can serve as tackifiers. Schnectady SP-553 is a thermoplastic terpene-phenolic resin tackifier having a 115° C. ring and ball softening point.

All of the compositions of Table III exhibited flexibility at −70° C. and did not fail a dead load cleavage test in water over a 48 hour period in which a 1 pound load was applied to 1 inch wide strips held together in cleavage by the adhesive. Under the same conditions, the normally adhesive copolymers without the elastomer failed within minutes or a few hours thus demonstrating the superior ability of the adhesive compositions of the present invention to withstand damp conditions.

The compositions also demonstrated excellent dead load creep resistance in shear during thermal cycling between −40° and +60° C. for a 6 pound load on a 1" square (load=6 p.s.i.) of galvanized steel bonded to galvanized steel. No slippage occurred over 90 days. Similar compositions employing Elvax 4320 (MI~150) as the normally adhesive copolymer failed a similar test at a load of 4 p.s.i. thereby demonstrating the superior creep resistance and load bearing characteristics of the adhesive formulations of this invention employing a low melt index adhesive copolymer.

EXAMPLE IV

The compositions of this invention can be conveniently extruded into sheet material and crosslinked by radiation to be rendered capable of being made into heat recoverable articles. Heat recoverability is imparted by heating the material above its crystalline softening point and dimensionally expending it and cooling it under tension to below the softening point. When heated again above this point, without restraint, the article will attempt to recover to its original, pre-expanded dimensions. This phenomenon is fully explained in U.S. Pat. No. 3,086,242, the disclosure of which is incorporated herein by reference.

By carefully adjusting the amount of radiation to which the material is exposed, sufficient crosslinking can be attained to allow the sheet to be rendered heat recoverable without crosslinking so greatly as to reduce the melt flow characteristics of the material to such an extent that adhesive character is lost. The amount of radiation which will accomplish this result will vary. Normally between 2.5 and 10 megarads is satisfactory but in specific cases more or less may be required.

The ability to effect crosslinking is particularly of value in improving the creep resistance of adhesive compositions containing high melt index adhesive polymer and gives advantages that cannot be achieved merely be using an adhesive polymer of low melt index in that the crosslinked composition will exhibit greater creep resistance under dynamic situations than would on uncrosslinked material from low melt index polymer which remains thermoplastic.

A composition comprising 70 parts by weight of Dexon XEA-4, the terpolymer of ethylene, vinyl acetate (6%) and acrylic acid (1.5%) having an MI of ~4 and 30 parts by weight of Vistalon 404 (see Example II for physical properties) when extruded into sheet material, exposed to 2.5 megarads of radiation, expanded to twice its original dimension, and wrapped about a 1" steel pipe and heated to occasion its recovery was self-fusing in the overlap area, and adhered so tightly to the pipe that scraping was necessary to remove it.

A composition of 65 parts by weight Elvax 4320 (MI~150) and 35 parts by weight Nordel 2522 when irradiated at 2.5 megarads was capable of being rendered heat recoverable and when shrunk about a metal rod was self-fusing demonstrating the effect of radiation on adhesive blends containing a high melt index adhesive copolymer. The same composition exposed to 10 megarads was heat recoverable but possessed insufficient melt flow to be adhesive.

EXAMPLE V

Yet another application of the adhesive compositions of the present invention is in thermosetting compositions. The preferred use for such compositions is in those situations where a high degree of flow is initially required, for example to insure that voids are filled or irregular configurations are adhered to, but subsequently it is expected that conditions will arise where resistance to flow is required. Accordingly, adhesive compositions of the present invention having a relatively high melt index (150 to about 500 or greater) to which has been added a heat activated crosslinking system are preferred. Suitable crosslinking systems include peroxide and azo initiators but it is presently preferred to employ phenolic resins having relatively high methylol content (10–12%) such as Bakelite CKM 1634 or Schnectady FRJ 551 up to about 10% by weight. Formulations of suitable compositions are set forth in Table IV below.

TABLE IV

| Thermosetting High Melt Index Adhesive Olefin/EPDM Blends | | | |
|---|---|---|---|
| | Percent by Weight | | |
| Elvax 4310 | 35.0% | 50.0% | 30.0% |
| Elvax 4320 | 29.4% | — | 35.0% |
| DPD 6169 | — | 13.0% | — |
| Nordel 2522 | 18.6% | 20.0% | 18.0% |
| Schnectady FRJ551 | 10.0% | 10.0% | 10.0% |
| Zinc Resinate | 5.0% | 5.0% | 5.0% |
| $Fe_2O_3$ | 1.7% | 1.7% | 1.7% |
| Irganox 1010 | 0.3% | 0.3% | 0.3% |

Elvax 4310 is an EVA acid terpolymer having ~500 melt index, ~25% vinyl acetate content and ~6 acid number. DPD 6169 is an ethylene-ethyl acrylate copolymer having ~6 melt index and ~18% ethyl acrylate content. Zinc resinate is the zinc salt of abietic acid or wood rosin. Irganox 1010 is an antioxidant, tetrakis [methylene 3-(3',5'-di-t-butyl-4'-hydroxyphenyl) propionate] methane. $Fe_2O_3$ is a colorant.

Samples of the formulations set forth in Table IV when heated to initiate the thermosetting reaction (~130° C.) formed tough but flexible materials. Comparable samples without the thermosetting agent melted under similar conditions.

The thermosetting reaction need not be initiated at the time the adhesive is employed. Conditions developed during service may be adequate to bring about the reaction. This is particularly useful when the external application of heat is difficult.

The formulations in Table IV comprising 30 and 35% by weight of Elvax 4310 respectively were employed as a void filler and adhesive in a cable splice for 600 KV electrical cable in which the spliced area was covered with a heat shrinkable tube. Creep resistance was excellent.

The foregoing examples have illustrated the useful properties of the adhesive compositions of the invention. It will be apparent to those skilled in the art that many practical utilities are possible by their employ. For example, they may be used to bond polymeric materials or metals to themselves or each other. A presently preferred application is as an adhesive liner to heat recoverable tubing adapted to be recovered about elongate substrates, for example, pipeline sections. In this application, the adhesive will flow at the temperature the tubing is caused to recover thereby filling any voids and firmly adhering the tube to the substrate to prevent the intrusion of moisture. A long lifetime is assured by the resistance to degradation by moisture exhibited by the adhesive compositions.

From the foregoing description, it will be apparent to those skilled in the art that other modifications are possible within the scope of the invention without departing from its spirit.

I claim:
1. An adhesive composition comprising
   (a) a normally adhesive copolymer of ethylene and at least one monoolefinically unsaturated polar comonomer, said copolymer containing at least about 50% by weight of combined ethylene, and
   (b) an ethylene-propylene elastomer which
      (i) has a substantially or fully saturated backbone;
      (ii) has a Mooney viscosity at 250° F. of less than about 70;
      (iii) contains less than about 55% by weight of combined ethylene; and
      (iv) is present in amount 15 to 50 parts by weight per 100 parts by weight of the elastomer and the normally adhesive copolymer together.
2. An adhesive composition according to claim 1 wherein said polar comonomer is selected from monoolefinically unsaturated esters and acids.
3. An adhesive composition according to claim 1 wherein the polar comonomer is a mixture of an unsaturated ester and an unsaturated acid.
4. An adhesive composition according to claim 1 wherein the normally adhesive polymer is a copolymer of ethylene, vinyl acetate, and a third comonomer selected from methacrylic acid and acrylic acid.
5. An adhesive composition according to claim 1 wherein the normally adhesive polymer has a melt index at 190° C. and 2160 gms which is from about 2 to about 1000.
6. An adhesive composition according to claim 5 wherein the melt index range is from about 4 to about 500.
7. An adhesive composition according to claim 1 wherein the elastomer is a copolymer of about 45 to 55% by weight of ethylene, 0–10% by weight of a nonconjugated diene and the balance propylene.

8. An adhesive composition according to claim 7 wherein the diene is 1,4-hexadiene or ethylidene norbornene.

9. An adhesive composition according to claim 1 comprising 20–35 parts by weight of the elastomer and 65–80 parts by weight of the normally adhesive polymer per 100 parts by weight of the adhesive polymer and the elastomer together.

10. An adhesive composition according to claim 1 that has been crosslinked by radiation.

11. An adhesive composition according to claim 1 that further comprises an effective amount of a heat activated crosslinking system.

12. An adhesive composition according to claim 1 wherein the elastomer has Mooney viscosity of about 45 or less.

13. An adhesive composition according to claim 1 wherein the elastomer has Mooney viscosity of about 20 to about 25.

14. An adhesive composition according to claim 1 in which the adhesive copolymer and the elastomer are substantially the only polymeric components.

15. An adhesive composition according to claim 14 which has been cross-linked by irradiation to a dosage of 2.5 to 10 megarads.

16. An adhesive composition according to claim 1 which has been cross-linked by heating.

17. An adhesive composition comprising
    (a) a normally adhesive copolymer which
        (i) contains 50 to 85% by weight of units derived from ethylene, with the balance of the copolymer being units derived from at least one monoolefinically unsaturated polar comonomer, and
        (ii) has a melt index at 190° C. and 2160 gms of 4 to 500; and
    (b) an ethylene-propylene elastomer which
        (i) has a substantially or fully saturated backbone;
        (ii) has a Mooney viscosity at 250° F. of about 45 or less;
        (iii) contains 40 to 55% by weight of units derived from ethylene and 2 to 10% by weight of units derived from a non-conjugated diene, with the balance of the elastomer being units derived from propylene; and
        (iv) is present in amount 15 to 50 parts by weight per 100 parts by weight of the copolymer (a) and the elastomer (b) together.

18. An adhesive composition according to claim 17 wherein the elastomer has a Mooney viscosity of about 20 to about 25.

19. An adhesive composition according to claim 17 wherein the elastomer is present in amount 20 to 35 parts by weight per 100 parts by weight of the copolymer (a) and the elastomer (b) together.

20. An adhesive composition according to claim 19 wherein the normally adhesive copolymer is a copolymer of ethylene and vinyl acetate.

21. An adhesive composition according to claim 20 wherein the normally adhesive copolymer is a copolymer of ethylene, vinyl acetate and a third comonomer selected from methacrylic acid and acrylic acid.

22. An adhesive composition according to claim 17 wherein the normally adhesive copolymer (a) has a melt index below 50.

23. An adhesive composition according to claim 17 wherein the normally adhesive copolymer (a) has a melt index above 50.

24. An adhesive composition according to claim 17 wherein the normally adhesive copolymer (a) has a melt index of at least 150 and which contains a heat-activatable cross-linking system.

25. An adhesive composition wherein the polymeric constituents consist essentially of
    (a) a normally adhesive copolymer of ethylene and at least one monoolefinically unsaturated polar comonomer, said copolymer containing at least about 50% by weight of combined ethylene;
    (b) a polyolefin elastomer which
        (i) has a substantially or fully saturated backbone,
        (ii) has a Mooney viscosity at 250° F. of less than about 70, and
        (iii) is present in amount 15 to 50 parts by weight per 100 parts by weight of the elastomer and the normally adhesive copolymer together; and optionally
    (c) a tackifier.

26. An adhesive composition according to claim 25 wherein the elastomer has a Mooney viscosity of about 45 or less.

27. An adhesive composition according to claim 26 wherein the elastomer has a Mooney viscosity of about 20 to about 25.

* * * * *